(12) United States Patent
Ryu et al.

(10) Patent No.: US 8,879,564 B2
(45) Date of Patent: Nov. 4, 2014

(54) METHOD TO ACCURATELY AND SECURELY DETERMINE PROPAGATION DELAY AND DISTANCE BETWEEN SENDING AND RECEIVING NODE IN PACKET NETWORK USING CUT-THROUGH APPROACH AND PACKET NETWORK NODE FOR EXECUTING THE METHOD

(75) Inventors: Hyun Surk Ryu, Suwon-si (KR); Geoffrey M. Garner, Red Bank, NJ (US); Cornelis Johannis Den Hollander, Yongin-si (KR); Fei Fei Feng, Yongin-si (KR); Kyu Hong Jung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 143 days.

(21) Appl. No.: 13/118,514

(22) Filed: May 30, 2011

(65) Prior Publication Data
US 2011/0243145 A1 Oct. 6, 2011

Related U.S. Application Data

(63) Continuation of application No. 11/600,046, filed on Nov. 16, 2006, now Pat. No. 8,018,973.

(60) Provisional application No. 60/772,302, filed on Feb. 11, 2006.

(30) Foreign Application Priority Data

Sep. 1, 2006 (KR) .................................. 2006-84403

(51) Int. Cl.
*H04L 12/28* (2006.01)
*H04L 12/56* (2006.01)
(Continued)

(52) U.S. Cl.
CPC ............ *H04J 3/0682* (2013.01); *H04L 43/0864* (2013.01); *H04L 43/10* (2013.01)

USPC ....................... 370/400; 370/252; 370/395.42

(58) Field of Classification Search
CPC ............ H04L 43/0852; H04L 47/2433; H04L 43/0864
USPC ............ 370/252, 389, 392, 395.42, 400, 410, 370/412, 428, 429, 519; 709/227–229, 238; 726/4, 26–30
See application file for complete search history.

(56) References Cited

U.S. PATENT DOCUMENTS 5,550,807 A * 8/1996 Kuroshita ..................... 370/252
6,047,330 A   4/2000 Stracke, Jr.
(Continued)

FOREIGN PATENT DOCUMENTS

JP   08-062334    3/1996
JP   08-265366    10/1996
(Continued)

OTHER PUBLICATIONS

Japanese Office Action issued on Nov. 2, 2010, in corresponding Japanese Patent Application No. 2008-554115 (3 pages).

(Continued)

*Primary Examiner* — Hoang-Chuong Vu
(74) *Attorney, Agent, or Firm* — NSIP Law

(57) ABSTRACT

A method and system for measuring a distance between nodes in a packet network are provided. The system and method include measuring and storing a departure time of a ping packet sent from a source node to a destination node, sending a response packet with respect to the ping packet from the destination node to the source node, cutting through the ping packet or response packet to a successive node or the destination node without an intermediate node delay, computing a round-trip time by measuring an arrival time of the response packet at the source node and measuring the distance between the nodes, based on the round-trip time and speed of the ping packet.

9 Claims, 10 Drawing Sheets

(51) Int. Cl.
*G01R 31/08* (2006.01)
*H04J 1/16* (2006.01)
*H04L 12/26* (2006.01)
*H04J 3/06* (2006.01)

(56) References Cited

U.S. PATENT DOCUMENTS

| | | | |
|---|---|---|---|
| 6,614,795 B1 | 9/2003 | Jimmei et al. | |
| 6,798,743 B1 * | 9/2004 | Ma et al. | 370/235 |
| 6,804,624 B2 | 10/2004 | Silverman | |
| 6,915,436 B1 | 7/2005 | Booth, III et al. | |
| 6,957,273 B2 * | 10/2005 | Haneda et al. | 709/240 |
| 6,961,781 B1 * | 11/2005 | Mukherjee et al. | 709/240 |
| 7,336,615 B1 * | 2/2008 | Pan et al. | 370/248 |
| 7,845,007 B1 * | 11/2010 | Kennis | 726/23 |
| 2001/0036181 A1 * | 11/2001 | Rogers | 370/389 |
| 2002/0087666 A1 | 7/2002 | Huffman et al. | |
| 2002/0087716 A1 * | 7/2002 | Mustafa | 709/236 |
| 2002/0129150 A1 | 9/2002 | Jung | |
| 2003/0035425 A1 | 2/2003 | Abdollahi et al. | |
| 2004/0063454 A1 | 4/2004 | Sasaki | |
| 2004/0133391 A1 | 7/2004 | Bovo et al. | |
| 2005/0058081 A1 | 3/2005 | Elliott | |
| 2005/0073961 A1 | 4/2005 | Paik et al. | |
| 2005/0175013 A1 * | 8/2005 | Le Pennec et al. | 370/395.42 |
| 2006/0288424 A1 * | 12/2006 | Saito | 726/26 |
| 2007/0195778 A1 * | 8/2007 | Tatar et al. | 370/392 |
| 2007/0223456 A1 * | 9/2007 | Maruyama et al. | 370/352 |

FOREIGN PATENT DOCUMENTS

| | | |
|---|---|---|
| JP | 2000-332715 | 11/2000 |
| JP | 2004-128798 | 4/2004 |
| KR | 10-2004-104395 | 12/2004 |

OTHER PUBLICATIONS

Hollander et al., "Use of Timing and Synchronization Mechanisms in Packet Networks to Determine Physical Distance Between End-Stations," Converged Residential Ethernet, Jan. 29, 2006, slides 1-27.

* cited by examiner

METHOD TO ACCURATELY AND SECURELY DETERMINE PROPAGATION DELAY AND DISTANCE BETWEEN SENDING AND RECEIVING NODE IN PACKET NETWORK USING CUT-THROUGH APPROACH AND PACKET NETWORK NODE FOR EXECUTING THE METHOD

CROSS-REFERENCE TO RELATED APPLICATIONS

This application is a continuation of U.S. patent application Ser. No. 11/600,046, filed on Nov. 16, 2006, which claims the benefit under 35 U.S.C. §119(e) of U.S. patent application Ser. No. 60/772,302, filed on Feb. 11, 2006, in the U.S Patent and Trademark Office, and claims the benefit under 35 U.S.C. §119(a) of Korean Patent Application No. 2006-84403, filed Sep. 1, 2006, in the Korean Intellectual Property Office, the entire disclosures of which are all incorporated herein by reference for all purposes.

BACKGROUND

1. Field

The present invention relates to a method of precisely and securely measuring a propagation delay and a distance between nodes. More particularly, the present invention relates to a method of measuring propagation delay and a distance between nodes by using a cutting through process in a packet network and a packet network node executing the same.

2. Description of the Related Art

Applications provided via a packet network may require digital rights management (DRM). DRM is a bundling of technologies supporting generation, distribution, and management of contents, such as securely protecting rights and profits of content providers, preventing illegal copies, imposing fees, and supporting payment agencies. A digital rights management includes technology for enabling only a legal user to use contents, a software and security technology for approving and executing copyright, and payment technology for enabling payment of a suitable fee.

To acquire an application requiring DRM, a digital media player (hereinafter, referred to as a player node) may be connected to a digital media server (hereinafter, referred to as a server node) via a packet network. In this case, an owner of the application may want to provide and replay the application in a geographically limited area.

For example, an owner of digital video disc (DVD) contents may request the contents to be transmitted and replayed by users in a certain area and not to be transmitted or replayed out of the certain area. To execute this request, a server node providing the contents has to determine whether a player node exists within a threshold distance.

In a conventional technology, to determine a distance between a server node and a player node, the server node sends a ping packet to the player node, measures a round-trip time of the ping packet, and determines a distance between the server node and the player node.

Namely, the server node sends a ping packet and records a departure time of the ping packet. The player node responds to the server node via a response packet corresponding to the received ping packet. The server node computes a round-trip time of the ping packet by an arrival time of the response packet and the departure time of the ping packet. When the round-trip time is over a predetermined delay threshold, the server node determines that the player node is out of the threshold distance and does not establish a connection to send contents.

In the conventional technology, a ping packet and a response packet may have a serious queuing delay occurring at intermediate nodes. This delay also occurs when giving a priority to the ping packet and the response packet in a non-preemptive type packet network. In such a network, the ping packet or response packet is processed after processing a frame previously being transmitted before an arrival of the ping packet or response packet.

For example, with a maximum size Ethernet frame including 1518 bytes of payload in 100 Mbps Ethernet, a queuing delay of 121 microseconds may occur in one node. Specifically, even though a ping packet passes through a small number of intermediate nodes, a considerable amount of queuing time delays in the order of milliseconds may occur. In addition, the greater the number of intermediate nodes, the greater the amount of time of the total queuing delays.

Also, in the conventional technology, when a dedicated unit is not used or a highest pre-emptive priority for processing the ping packet is not given in a process of receiving a ping packet at a player node and sending a response packet corresponding to the ping packet at a server, an additional queuing delay may occur.

Considering a delay for propagating a signal in a typical local area network (LAN) or a wide area network (WAN) of 8 nanoseconds per meter, the delay with respect to 30-100 meters will be 240 to 800 nanoseconds, namely, a time less than 1 microsecond. Hence the above queuing delay may greatly exceed the delay for propagating a signal over a threshold distance.

FIG. 1 is a diagram illustrating a conventional method of determining a propagation delay and a distance between nodes in a packet network. A server node 101 sends a ping packet 103 to a player node 102 to measure a distance between the server node 101 and the player node 102. In this case, the ping packet 103 may pass through one or more intermediate nodes 104. Though the ping packet 103 has a higher priority than other packets waiting to be sent at the intermediate node 104, a queuing delay occurs due to a packet being sent in a non-preemptive type packet network 100.

In this case, the ping packet 103 waits at the intermediate node 104 until sending of a packet 106 is completed, and therefore has the queuing delay greater than the propagation delay between nodes as described above. During the queuing delay, the ping packet may be stored in a storage 105.

To consider the queuing delay, a delay threshold in a packet network has to be established to be greater than a sum of propagation delays. However, determining a time limit for the delay threshold to be sufficient enough to avoid a refusal of providing a service to a legal user may cause a decrease in reliability of the packet network because a service may be provided to a player node beyond a threshold distance when the packet network is lightly loaded.

Accordingly, there exists a need for a method of precisely and securely measuring a propagation delay and a distance between nodes in a packet network, and a packet network node executing the same.

SUMMARY

Exemplary embodiments of the present invention address at least the above problems and/or disadvantages and provide at least the advantages described below. Accordingly, an exemplary aspect of the present invention provides a method of precisely and securely measuring a propagation delay and a distance between nodes by cutting through in a packet network, and a packet network node executing the method.

An exemplary aspect of the present invention is to precisely and securely measure a propagation delay and a distance between nodes by cutting through, eliminating an intermediate node delay by a process of giving a pre-emptive priority to a ping packet or response packet, storing other packets currently in transmission or waiting for transmission, and resending the other packets after completion of transmission of the ping packet or response packet when the ping packet or response packet that is not destined for a certain node in a packet network is received by the same node.

An additional exemplary aspect of the present invention is to more precisely measure a propagation delay and a distance by changing a field of a ping packet and sending the ping packet to a source node of the ping packet as a response packet when the ping packet whose destination is a certain node is received.

An additional exemplary aspect of the present invention is to perform digital rights management (DRM) of contents by allowing a destination node within a desired distance or zone to establish connection or replay of the contents, by determining the distance.

According to an exemplary aspect of the present invention, there is provided a method of measuring a distance between nodes in a packet network, the method including transmitting a ping packet from a first node to a second node through at least one of a plurality of third nodes, determining a departure time of the ping packet, transmitting a response packet with respect to the ping packet from the second node to the first node through the at least one of the plurality of the third nodes, prioritizing a transmission of at least one of the ping packet and response packet from the at least one of the plurality of third nodes, determining a round-trip time by determining an arrival time of the response packet, and determining a distance based on the round-trip time and a speed of the ping packet.

An exemplary operation of prioritizing of the transmission of the at least one of the ping packet and response packet without delay may include receiving the at least one of the ping packet and the response packet by at least one of the third nodes, giving priority to the received at least one of the ping packet and response packet, storing other packets being sent or waiting for transmission, suspending transmission of the other packets, transmitting the received at least one of the ping packet and response packet to at least one of another third node and the second node, and resuming transmission of the other packets after the transmission of at least one of the ping packet and response packet is completed.

An exemplary operation of transmitting a response packet with respect to the ping packet from the second node to the first node may include exchanging an address of the first node included in the ping packet with an address of the second node included in the ping packet, changing a packet type identifier included in the ping packet from a ping type to a response type and sending the ping packet to the first node, as the response packet.

Each of the first node, the second node and the plurality of third nodes comprise a dedicated unit for processing a input packet input and each of the first node, the second node and the at least one of the plurality of third nodes of the packet network processes the ping packet, the response packet, or the intermediate node delay via the dedicated unit.

According to another exemplary aspect of the present invention, there is provided a method of processing a packet in a dedicated unit included in each node in a packet network, the method including receiving a packet at a node in a packet network, determining a packet kind of the packet received at the node and processing the packet at the node, based on the packet kind.

BRIEF DESCRIPTION OF THE DRAWINGS

The above and/or other aspects and advantages of embodiments of the present invention will become apparent and more readily appreciated from the following detailed description, taken in conjunction with the accompanying drawings of which.

Throughout the drawings, the same drawing reference numerals will be understood to refer to the same elements, features, and structures.

DETAILED DESCRIPTION

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Reference will now be made in detail to exemplary embodiments of the present invention, examples of which are illustrated in the accompanying drawings.

Figure 1:
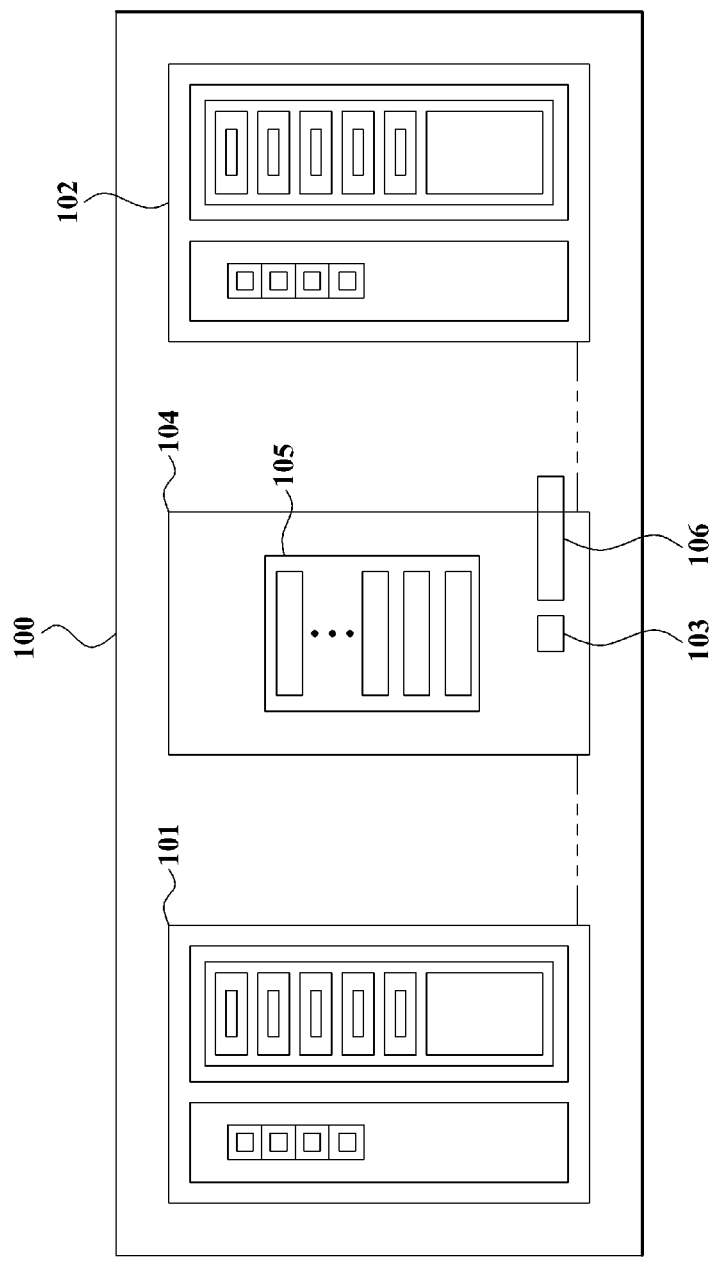
FIG. 1 is a diagram illustrating a conventional method of determining a propagation delay and a distance between nodes in a packet network.
Figure 2:
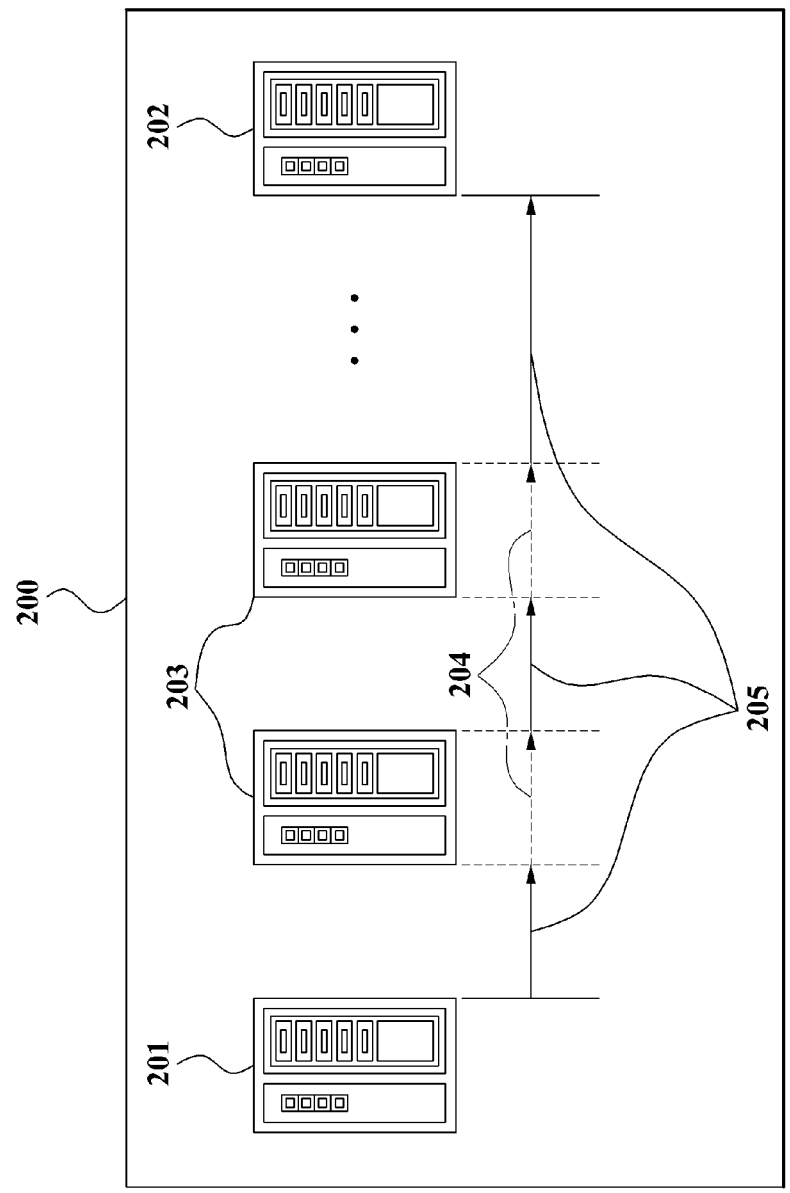
FIG. 2 is a diagram illustrating a method of measuring a propagation delay and a distance between nodes in a packet network, according to an exemplary embodiment of the present invention.

FIG. 2 is a diagram illustrating a method of measuring a propagation delay and a distance between nodes in a packet network 200, according to an exemplary embodiment of the present invention. Referring to FIG. 2, when a ping packet sent from a source node 201 of the packet network 200 passes through at least one intermediate node 203 while being sent to a destination node 202, an intermediate node delay 204 that is a time delay at the intermediate node 203 may occur.

In an exemplary embodiment, a propagation delay 205 between the source node 201 and the destination node 202 may be precisely measured by removing the intermediate node delay 204, and a distance between the source node 201 and the destination node 202 may be determined by using the propagation delay 205.

The determined distance is used for digital rights management (DRM) of contents to establish a valid distance with respect to the contents and to send or replay the contents within the valid distance.

Hereinafter, an exemplary method of measuring a propagation delay and a distance between nodes by removing an intermediate node delay at an intermediate node will be described in detail.

Figure 3:
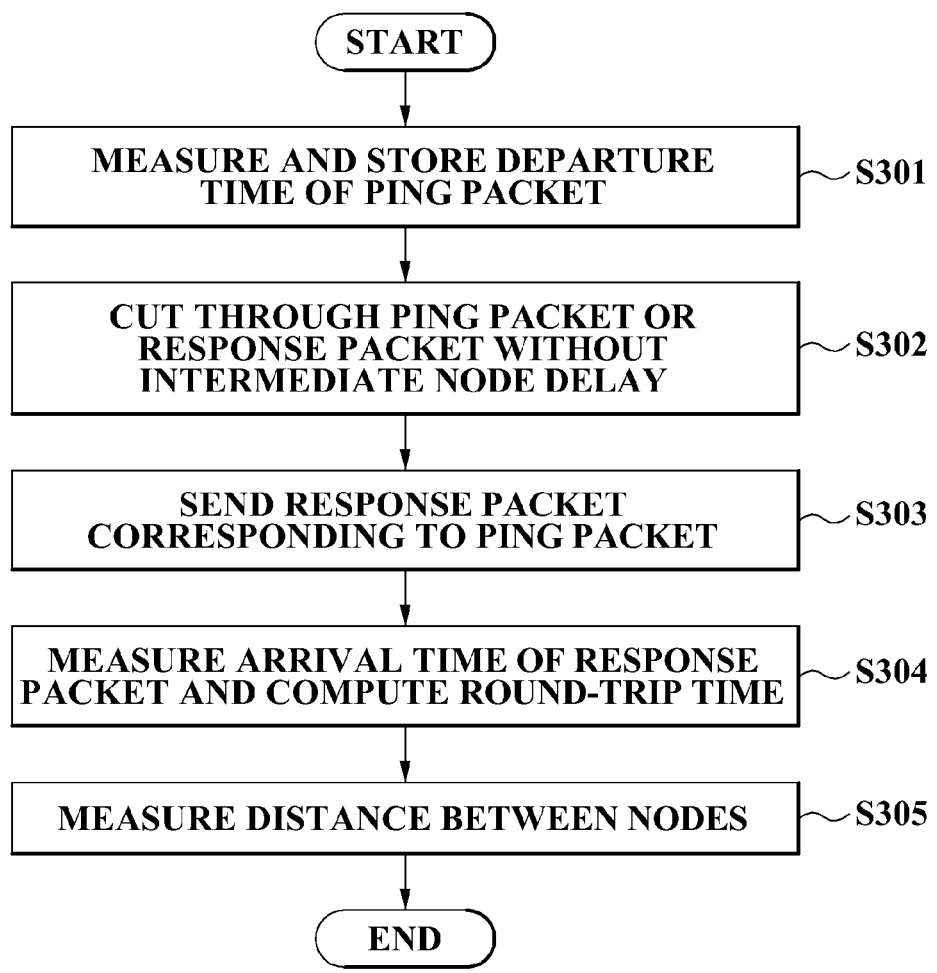
FIG. 3 is a flowchart illustrating the method of measuring a distance between nodes in a packet network according to an exemplary embodiment of the present invention.

FIG. 3 is a flowchart illustrating an exemplary method of measuring a distance between nodes in a packet network.

In operation S301, a source node sending a ping packet to a destination node measures and stores a departure time of the ping packet. The departure time may be used for measuring a round-trip time of the ping packet.

In operation S302, an intermediate node, through which the ping packet passes while being sent from the source node to the destination node, causes the ping packet to cut through to a successive node or the destination node without an intermediate node delay. Similarly a response packet is caused to cut through at an intermediate node while being sent from a destination node to the source node. The method of removing the intermediate node delay will be described in detail, referring to FIGS. 4 and 5.

In operation S303, the destination node sends a response packet, with respect to the ping packet, to the source node. To reduce a delay at the destination node, the destination node changes a field of the ping packet and sends the ping packet, as the response packet, without newly generating a response packet, to the source node. Operation S303 will be described in detail, referring to FIG. 6.

In operation S304, the source node measures an arrival time of the response packet and computes the round-trip time. The round-trip time may be computed by using a difference between the arrival time and the departure time measured in operation S301. The round-trip time from which the intermediate node delay is removed may be used for determining whether to establish a connection with the destination node or whether transmission of contents is permissible.

Namely, the source node may determine a time limit for the delay threshold with respect to the round-trip time and may restrict the establishment of the connection or the transmission of the contents when the round-trip time exceeds a time limit for the delay threshold.

In operation S305, the source node determines a distance between the nodes, based on the round-trip time and the propagation speed of the ping packet. Each node of the packet network may process the ping packet, the response packet, or the intermediate node delay by using a dedicated unit for processing a packet input to the node.

As described above, establishing a connection or replaying contents is allowed to a destination node within a desired distance or area by determining the round-trip time or the distance between nodes, thereby performing DRM.

Figure 4:
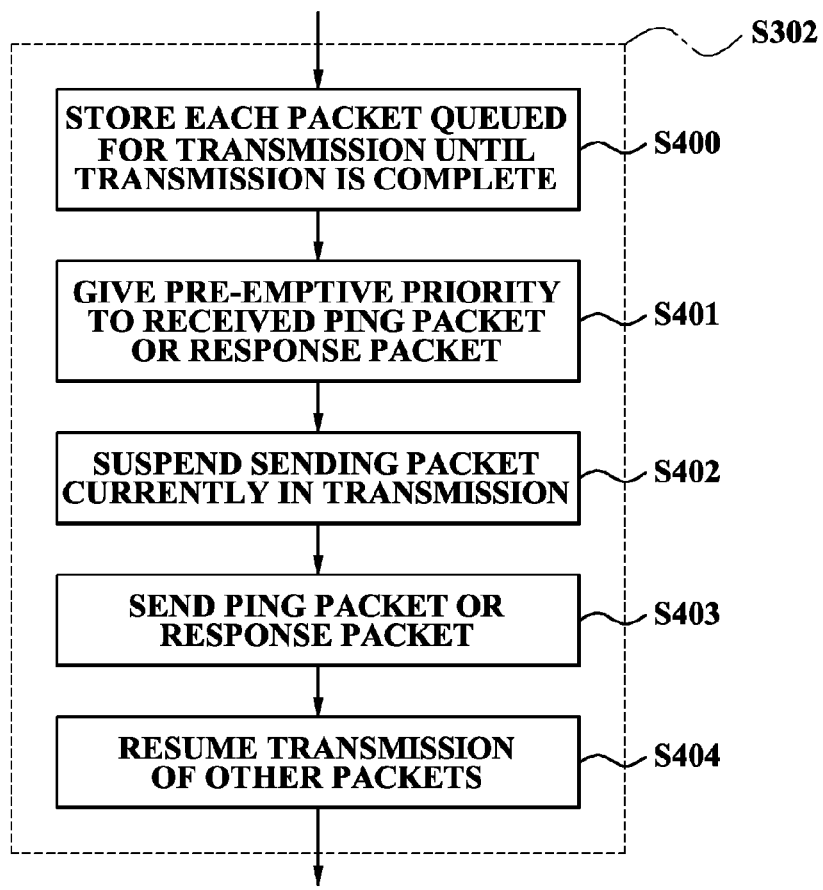
FIG. 4 is a flowchart illustrating a method of sending a ping packet or response packet without an intermediate node delay at an intermediate node, according to an exemplary embodiment of the present invention.

FIG. 4 is a flowchart illustrating a method of sending a ping packet or response packet without an intermediate node delay at an intermediate node, according to an exemplary embodiment of the present invention. Referring to FIG. 4, sub-operations S400 through S404 may be performed or included in operation S302 illustrated in FIG. 3.

In sub-operation S400, the intermediate node stores each packet for transmission until transmission of the ping packet or the response packet is complete.

In sub-operation S401, the intermediate node gives a pre-emptive priority to the ping packet or response packet when receiving the ping packet or response packet. Since the ping packet or response packet pre-empts resources related to a sending unit of the intermediate node, the ping packet or response packet may be sent prior to other packets already received and waiting for transmission at the node.

In sub-operation S402, the intermediate node stores the other packets currently being sent or waiting for transmission and suspends sending. With respect to the other packets currently being sent, even though a part of the packet is already sent, all bytes of the packet may be stored.

In sub-operation S403, the intermediate node sends the ping packet or response packet to the successive node or the destination node.

In sub-operation S404, the intermediate node resumes transmission of the other packets after completion of transmission of the ping packet or response packet including resending packets that have been partially sent.

Figure 5:
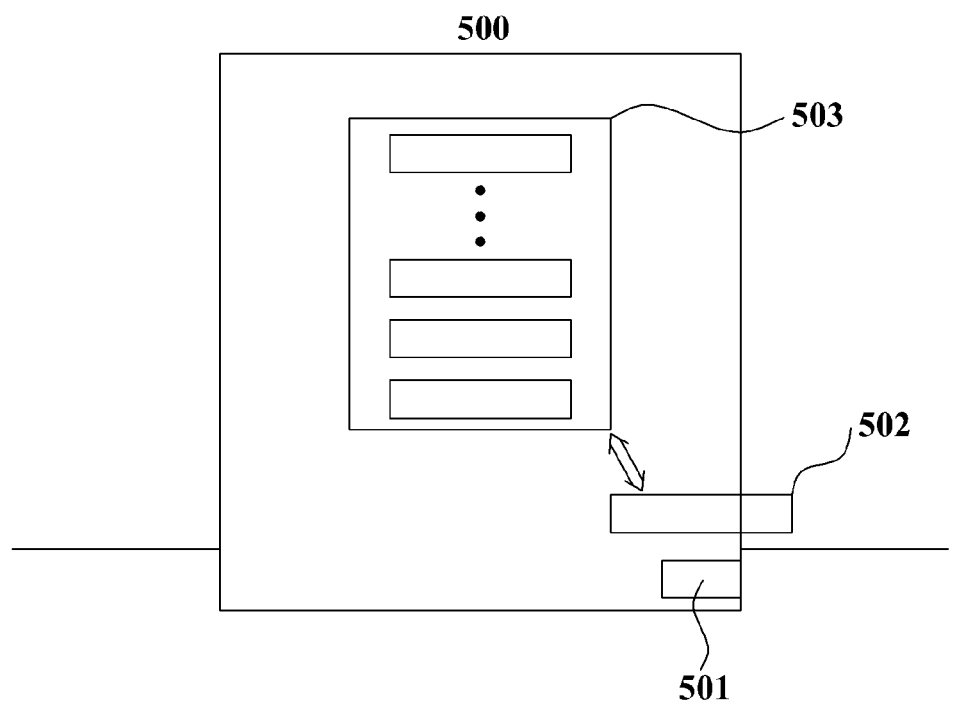
FIG. 5 illustrates an example of a method of removing an intermediate node delay at an intermediate node according to an exemplary embodiment of the present invention.

FIG. 5 illustrates an example of a method of removing an intermediate node delay at an intermediate node 500, according to an exemplary embodiment of the present invention. Referring to FIG. 5, the intermediate node 500 gives a pre-emptive priority to a ping packet 501 to remove an intermediate node delay and suspends transmission of another packet 502 currently being sent or waiting for transmission. The other packet 502 was stored on arrival at the node, and is retained until it is successfully transmitted. The other packet 502 waits in a storage 503, such as a buffer or queue, before completion of the transmission of the ping packet 501 and is resent after the completion of the transmission of the ping packet 501. In this case, even though a part of the other packet 502 is already sent, an entirety of the other packet 502 may be stored to be resent.

As described above, the intermediate node delay with respect to the ping packet 501 is removed, thereby more precisely measuring the round-trip time.

Figure 6:
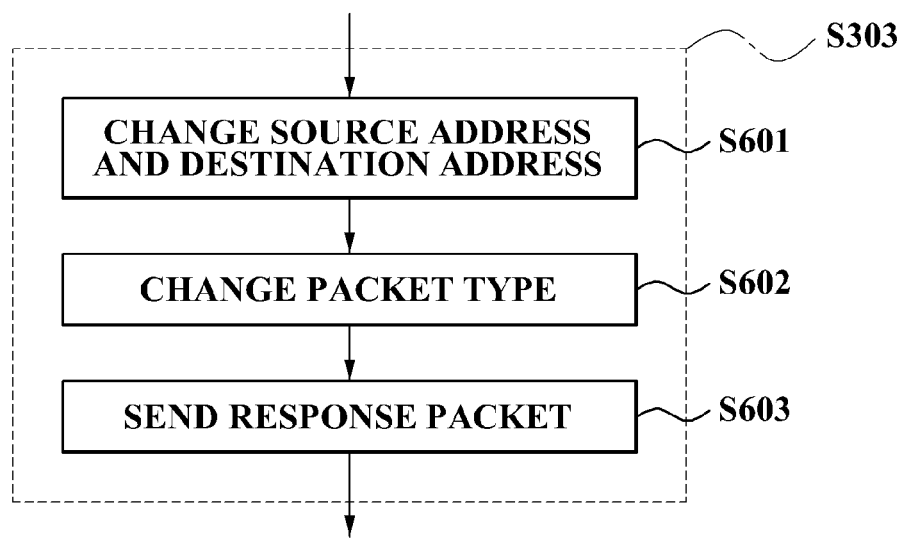
FIG. 6 is a flowchart illustrating a method of sending a response packet with respect to a ping packet, according to an exemplary embodiment of the present invention.

FIG. 6 is a flowchart illustrating a method of sending a response packet with respect to a ping packet, according to an exemplary embodiment of the present invention. Referring to FIG. 6, sub-operations S601 through S603 may be performed included in operation S303 illustrated in FIG. 3.

In sub-operation S601, a destination node receiving the ping packet and sending the response packet exchanges a source address and a destination address included in the ping packet. The source address may be extracted and stored from a source address field of the received ping packet and the destination address of the destination node may be recorded in the source address field.

Also, the extracted and stored source address may be recorded in a destination address field of the ping packet, thereby exchanging the source address and the destination address.

The above exemplary method is possible when a source address is recorded in a first field of the ping packet and a destination address is recorded in a second field. The method is performed in an input order of the ping packet to reduce a delay at the destination node.

In sub-operation S602, the destination node changes a packet type included in the ping packet into a packet type of the response packet. Namely, since the response packet is not newly generated and the ping packet is sent as the response packet by changing the address in sub-operation S601 and the packet type in sub-operation S602, the delay at the destination node may be reduced.

In sub-operation S603, the destination node sends the ping packet to the source node, as the response packet.

Figure 7:
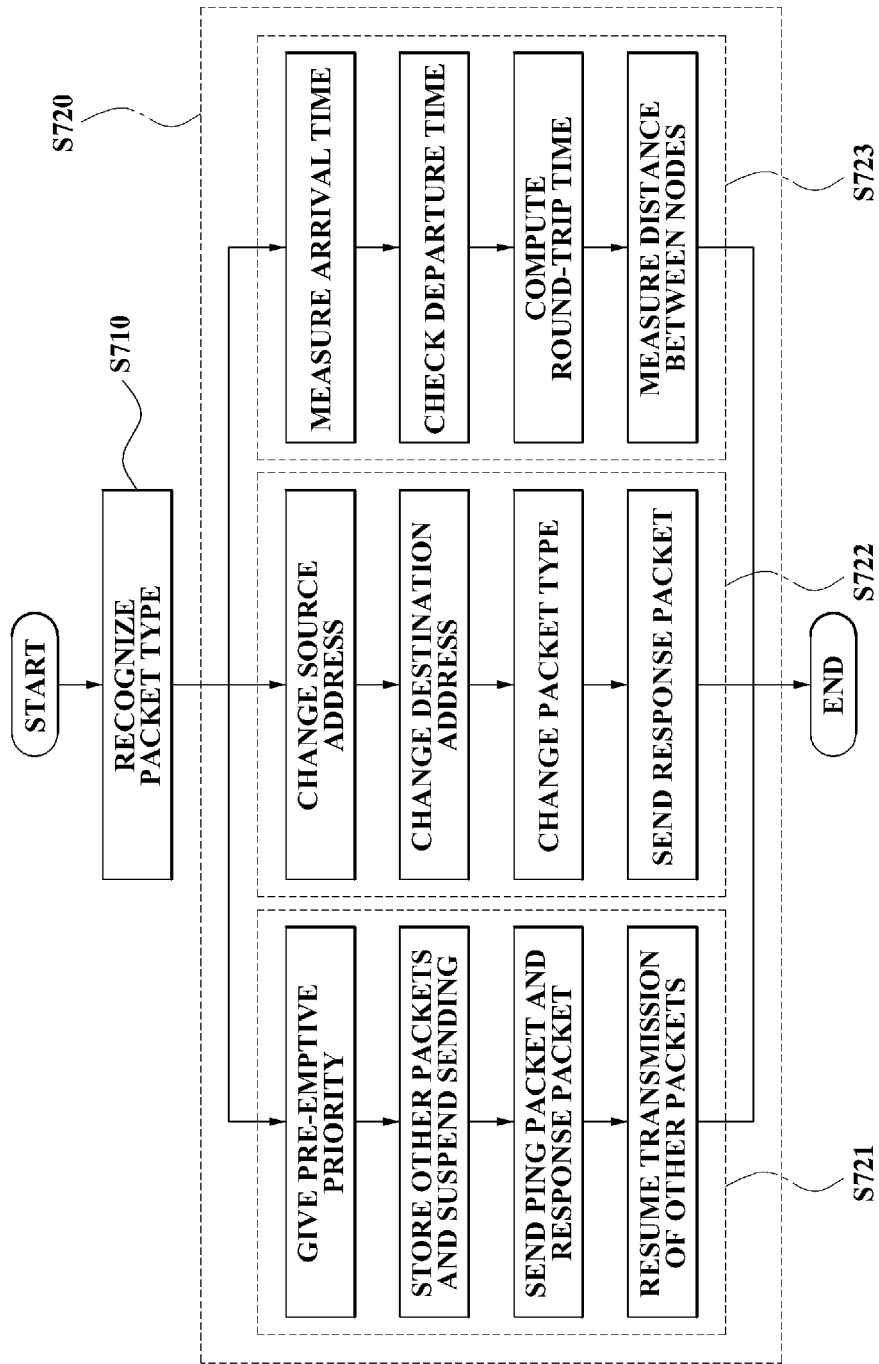
FIG. 7 is a flowchart illustrating a method of processing a packet at a dedicated unit included in each node in a packet network, according to an exemplary embodiment of the present invention.

FIG. 7 is a flowchart illustrating a method of processing a packet at a dedicated unit included in each node in a packet network, according to an exemplary embodiment of the present invention.

In operation S710, the dedicated unit checks a packet received at the node and recognizes a packet kind of the packet. In this case, the packet kind may be recognized by using a destination address and a packet type included in the packet.

In operation S720, the dedicated unit processes the packet according to the packet kind at the node. In this case, operation S720 may include sub-operations S721 through S723.

In sub-operation S721, when the packet kind corresponds to a ping packet or response packet that is not destined for the same node, the dedicated unit removes a delay of the ping packet or response packet at the node and sends the ping packet or response packet to a successive node.

In this case, sub-operation S721 may include giving a pre-emptive priority to the ping packet or response packet when the ping packet or response packet is received, storing other packets currently being sent or waiting for transmission and suspending sending, sending the ping packet or response packet, and resuming transmission of the other packets after completion of transmission of the ping packet or response packet.

In sub-operation S722, when the packet kind is a ping packet destined for the same node, the dedicated unit changes a field of the ping packet and sends the ping packet to a source node of the ping packet, as a response packet.

Also, sub-operation S722 may include changing a source address in a source address field of the ping packet into an address of the node, changing a destination address of the ping packet into the source address, changing a packet type of the ping packet into a packet type of the response packet, and sending the ping packet to the source node, as the response packet.

In addition, the ping packet may respond to authentication of the node by using a security key shared with the packet network.

In sub-operation S723, when the packet kind is a response packet destined for the same node, the dedicated unit computes a round-trip time and measures a distance between the node and a source node of the response packet.

In this case, sub-operation S723 may include measuring an arrival time of the response packet, recognizing a departure time of a ping packet from the node, computing the round-trip time by using a difference between the arrival time and the departure time, and measuring the distance, based on the round-trip time and speed of the ping packet or response packet.

Figure 8:
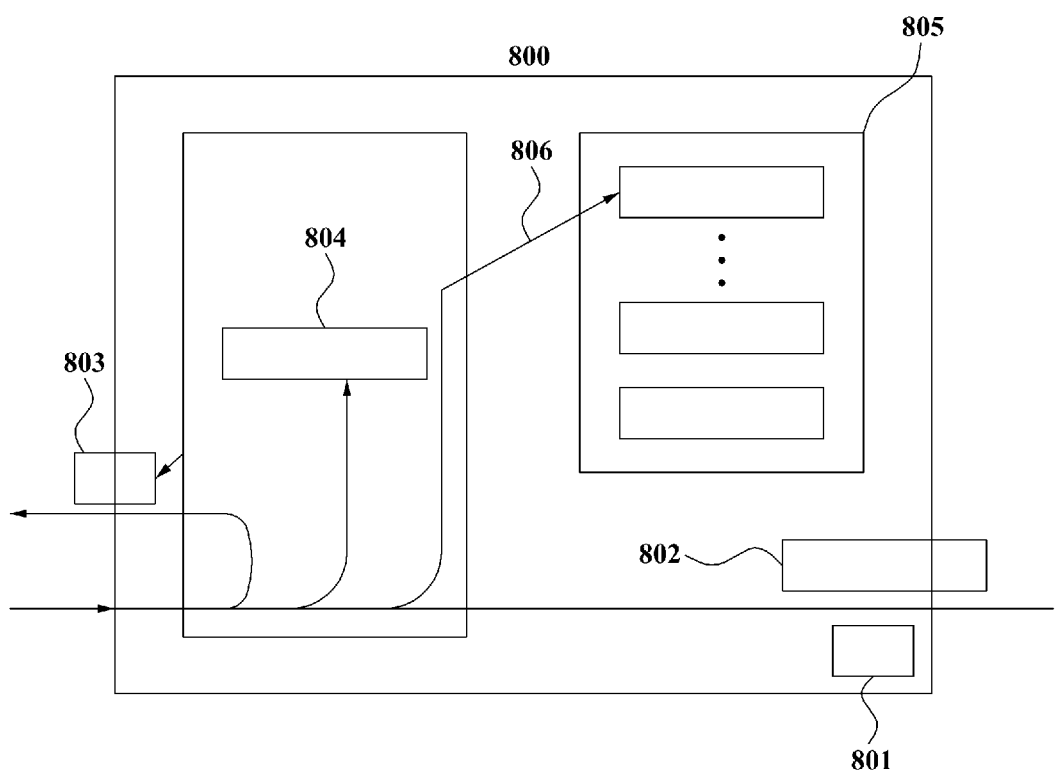
FIG. 8 illustrates an example of the method of processing the packet at a dedicated unit according to an exemplary embodiment of the present invention.

FIG. 8 illustrates an example of a method of processing the packet at a dedicated unit 800. The dedicated unit 800 included in each node of a packet network recognizes a packet kind of a received packet and processes the packet according to the packet kind.

When the packet kind is a ping packet or response packet 801 not destined for a node including the same dedicated unit 800, the dedicated unit 800 removes a delay of the ping packet or response packet 801 at the node and sends the ping packet or response packet 801 to a successive node. In this case, another packet 802 currently being sent or waiting for transmission at the node is preempted, remains stored and waits until completion of transmission of the ping packet or response packet 801.

Also, when the packet kind is a ping packet destined for the node, the dedicated unit 800 changes a field of the ping packet and sends the ping packet to a source node of the ping packet, as a response packet 803.

In addition, when the packet kind is a response packet 804 destined for the node, the dedicated unit 800 computes a round-trip time and measures a distance between the node and a source node of the response packet 804. Additionally, when the packet is a response packet 804 destined for the node, the dedicated unit 800 may route the response packet for storage 806 either after the time and distance computations are made or to allow computations to be made later.

When the packet kind is the other packet 802, the dedicated unit 800 stores the other packet 802 in a storage 805, such as a buffer or queue, until the packet is successfully transmitted.

Figure 9:
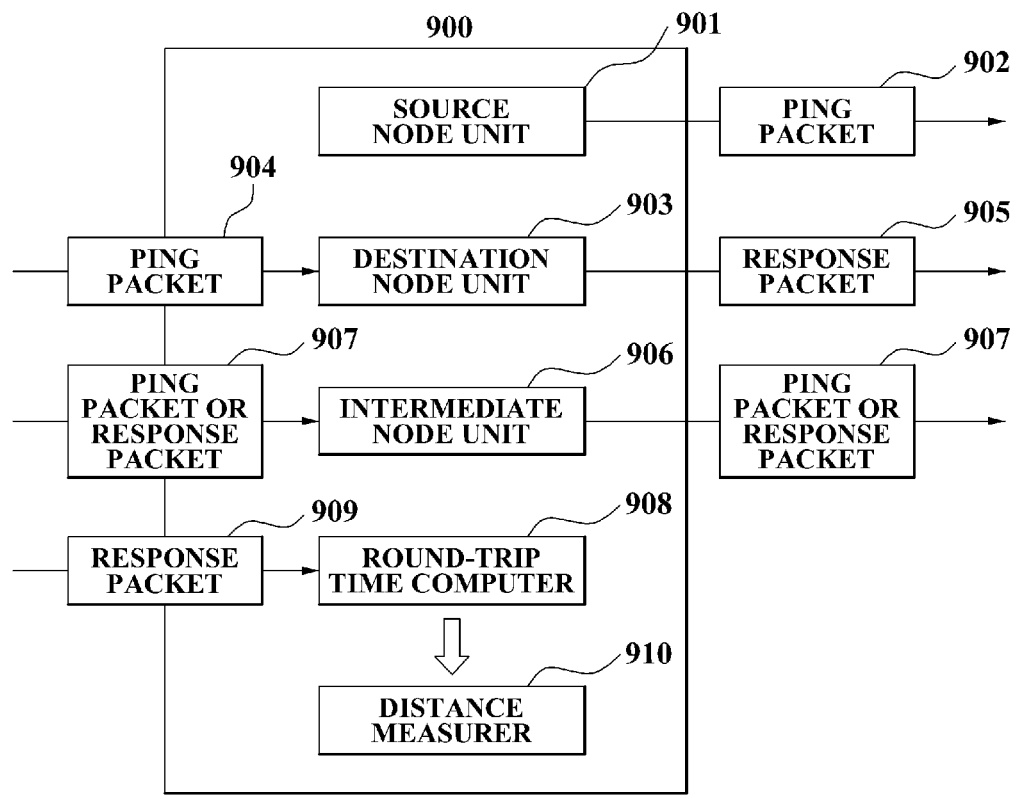
FIG. 9 is a block diagram illustrating an internal configuration of a packet network node measuring a distance between nodes, according to another exemplary embodiment of the present invention.

FIG. 9 is a block diagram illustrating an internal configuration of a node 900 of a packet network, measuring a distance between nodes, according to another exemplary embodiment of the present invention. Referring to FIG. 9, each node 900 included in the packet network may include a source node unit 901, a destination node unit 903, an intermediate node unit 906, a round-trip time computer 908, and a distance measurer 910.

The source node unit 901 measures, stores, and sends a departure time of a ping packet 902, for measuring a distance between nodes. In this case, the departure time may be measured by using a timing signal provided for synchronization by the packet network.

The destination node unit 903 sends a response packet 905 corresponding to a ping packet 904 to a source node when receiving the ping packet 904 destined for the node 900. The destination node unit 903 may include an address exchanger (not shown) exchanging a source address and a destination address included in the ping packet 904, a packet type changer (not shown) changing a packet type of the ping packet 904 into a packet type of the response packet 905, and a packet sender (not shown) sending the ping packet 904 to the source node, as the response packet 905.

The intermediate node unit 906 cuts a ping packet or response packet 907 not destined for the same node 900 through a successive node without an intermediate node delay when receiving the ping packet or response packet 907. An internal configuration of the intermediate node unit 906 will be described in detail, referring to FIG. 10.

The round-trip time computer 908 measures an arrival time of a response packet 909 destined for the node 900 and computes a round-trip time.

The distance measurer 910 measures a distance between the nodes, based on the round-trip time.

As described above, when a certain node of a packet network receives a ping packet or response packet not destined for the same node, a pre-emptive priority is given to the ping packet or response packet and another packet currently being sent or waiting for transmission remains stored and waits until completion of transmission of the ping packet or response packet, thereby cutting through without an intermediate node delay to more precisely determine the propagation delay and a distance between nodes.

Figure 10:
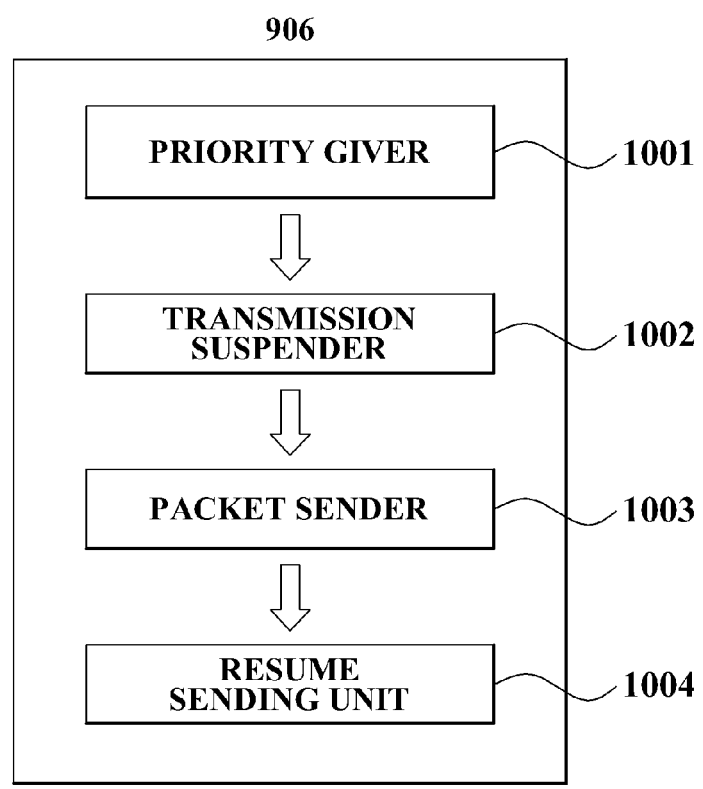
FIG. 10 is a block diagram illustrating an internal configuration of an intermediate node part, according to another exemplary embodiment of the present invention.

FIG. 10 is a block diagram illustrating an internal configuration of an intermediate node part, according to another exemplary embodiment of the present invention. Referring to FIG. 10, an intermediate node unit 906 may include a priority giver 1001, a transmission suspender 1002, a packet sender 1003, and a resume sending unit 1004.

The priority giver 1001 gives a pre-emptive priority to a ping packet or response packet when receiving the ping packet or response packet. Since the ping packet or response packet pre-empts resources related to a sending unit of the intermediate node, the ping packet or response packet may be sent prior to other packets already received and waiting for transmission at the node.

The transmission suspender 1002 stores the other packets currently being sent or waiting for transmission and suspends transmission. In this case, with respect to the other packets, even though a part of the other packet is already sent, all bytes of the other packet may be stored.

The packet sender 1003 sends the ping packet or response packet to the successive node or a destination node of the ping packet or response packet.

The resume sending unit 1004 resumes the transmission of the other packets after completion of the transmission of the ping packet or response packet.

As described above, according to exemplary embodiments of the present invention, when a certain node of a packet network receives a ping packet or response packet not destined for the same node, a pre-emptive priority is given to the ping packet or response packet, other packets currently being sent or waiting for transmission remain stored and wait until completion of transmission of the ping packet or response packet, thereby more precisely determining a propagation delay and a distance between nodes without an intermediate node delay.

Also, when the node receives a ping packet destined for the node, a field of the ping packet may be changed and the ping packet is sent to a source node of the ping packet, as a response packet of the ping packet, thereby reducing a delay of the ping packet at a destination node to more precisely determine a propagation delay and a distance between the nodes. Establishing a connection or replaying contents may be allowed to a node within a desired distance or area by the determination of the distance, thereby performing DRM of the contents.

Exemplary embodiments according to the present invention may be executed by a program instruction capable of being executed via various computer units and may be recorded in a computer-readable recording medium. The computer-readable medium may include a program instruction, a data file, and a data structure, separately or cooperatively. The program instructions and the media may be those specially designed and constructed for the purposes of the present invention, or they may be of the kind well-known and available to those skilled in the art of computer software arts. Examples of the computer-readable media include magnetic media (e.g., hard disks, floppy disks, and magnetic tapes), optical media (e.g., CD-ROMs or DVDs), magneto-optical media (e.g., optical disks), and hardware devices (e.g., ROMs, RAMs, or flash memories, etc.) that are specially configured to store and perform program instructions. The media may also be transmission media such as optical or metallic lines, wave guides, etc. including a carrier wave transmitting signals specifying the program instructions, data structures, etc. Examples of the program instructions include both machine code, such as produced by a compiler, and files containing high-level language codes that may be executed by the computer using an interpreter. The hardware elements above may be configured to act as one or more software modules for implementing the operations of this invention.

An exemplary aspect of the present invention is to precisely and securely measure a propagation delay and a distance between nodes by cutting through, without an intermediate node delay by a process of giving a pre-emptive priority to a ping packet or response packet, storing other packets currently in transmission or waiting for transmission, and resending the other packets after completion of transmission of the ping packet or response packet when the ping packet or response packet that is not destined for the same node in a packet network is received by the node.

An exemplary aspect of the present invention is also to more precisely measure a propagation delay and a distance by changing a field of a ping packet and sending the ping packet to a source node of the ping packet as a response packet when the ping packet whose destination is a certain node is received.

An exemplary aspect of the present invention is also to perform DRM of contents by allowing a destination node within a desired distance or zone to establish connection or replay of the contents, by determining the distance.

Although a few exemplary embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of processing a packet in a dedicated unit included in a node of a packet network, the method comprising:

receiving a packet at the node in the packet network;
determining a packet kind of the packet received at the node; and
prioritizing the packet at the node, based on the packet kind, wherein the prioritizing comprises:
in response to the packet not being destined for the node, assigning pre-emptive priority to the packet, suspending transmission of another packet that has been partially transmitted, and transmitting the pre-emptive priority packet,
in response to the packet being a ping packet destined for the node, changing a field of the ping packet and sending the packet as a response packet; and
in response to the packet being a response packet destined for the node, computing a round-trip time of the packet.

2. The method of claim 1, wherein the prioritizing of the packet at the node based on the packet kind comprises preventing a delay of the packet at the node and sending the packet to a successive node, in response to the packet not being destined for the node.

3. The method of claim 2, wherein the preventing of the delay of the packet at the node and sending the packet to a successive node comprises:

storing the other packet that is in the process of being transmitted;
transmitting the packet to the successive node or a destination node; and
resuming transmission of the stored other packet after the transmission of the packet is completed.

4. The method of claim 1, wherein the prioritizing of the packet at the node, based on the packet kind comprises;

changing the field of the packet; and
sending the packet to a source node from which the packet originated.

5. The method of claim 4, wherein the sending of the packet to the source node comprises:

changing a destination address of the packet into an address of the source node;

changing a packet type identifier included in the packet from a ping type into a response type; and sending the ping packet to the source node, as the response packet.

6. The method of claim 5, further comprising authenticating the packet by the node wherein the packet responds to the authentication of the node by using a security key shared with the packet network.

7. The method of claim 1, wherein the prioritizing the packet at the node, based on the packet kind comprises determining a distance based on the round-trip time, in response to the packet kind being a response packet destined for the node.

8. The method of claim 7, wherein the determining of the distance comprises:

determining an arrival time of the packet at the node;
determining a departure time of the packet from the node;
computing the round-trip time by using a difference between the arrival time and the departure time; and
determining the distance based on the round-trip time and speed of the packet.

9. The method of claim 1, wherein the node is an intermediate node, and the prioritizing comprises assigning pre-emptive priority to both a ping packet that is not destined for the node and also assigning pre-emptive priority to a response packet that is not destined for the node to reduce a round-trip transmission of the ping packet and the response packet between a source node and a destination node.

* * * * *